(No Model.)

F. KOSKUL.
Manufacture of Ornamented Wood.

No. 240,256. Patented April 19, 1881.

Witnesses:
J. P. Theo Lang.
H. N. Hall

Inventor:
Frederick Koskul
by his atty
Mason Fenwick Lawrence

UNITED STATES PATENT OFFICE.

FREDERICK KOSKUL, GRAND RAPIDS, MICHIGAN.

MANUFACTURE OF ORNAMENTED WOOD.

SPECIFICATION forming part of Letters Patent No. 240,256, dated April 19, 1881.

Application filed February 9, 1881. (Specimens.)

*To all whom it may concern:*

Be it known that I, FREDERICK KOSKUL, a citizen of the United States, residing at Grand Rapids, in the county of Kent and State of Michigan, have invented a new and useful Manufacture of Compound Natural and Composition Ornamental Wood for Furniture and other Articles, of which the following is a specification.

The nature of my invention consists in a skeleton natural-wood frame or foundation, having ornaments of composition formed on and securely united to it in the operation of forming the ornaments, as will be presently described.

Figure 1:
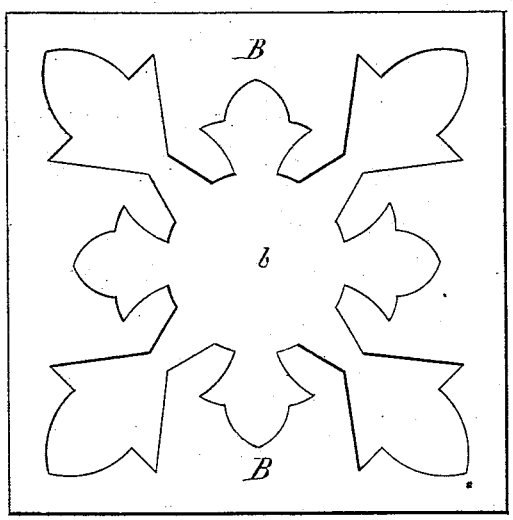
Figure 2:
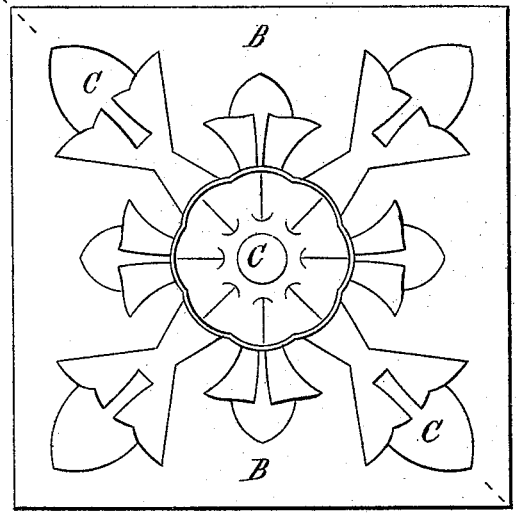
Figure 3:
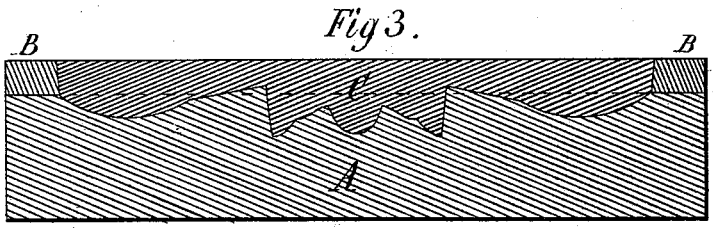
Figure 4:
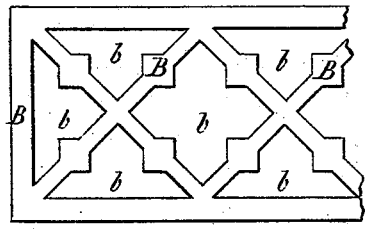
Figure 5:
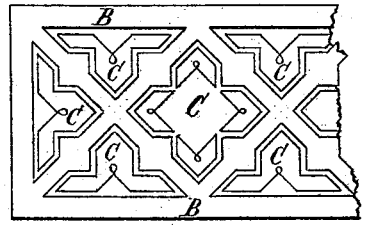
Figure 6:
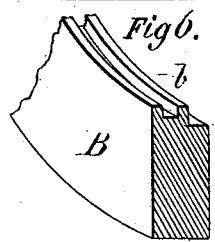
Figure 7:
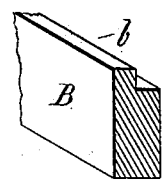
Figures 8, 9:
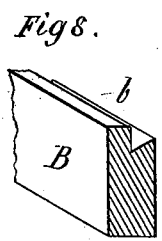
Figure 10:
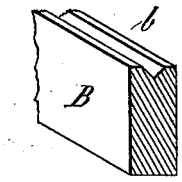

In the accompanying drawings, Figure 1 is a front elevation of a skeleton-frame prepared for the reception of those ornaments which in cases of furniture are usually very highly or elaborately carved. The passages through the same are in outline of a form corresponding to the intended ornamentation. Fig. 2 is a similar view, showing the skeleton wood frame and the composition ornaments united together in accordance with my invention. Fig. 3 is a section of a mold, skeleton-frame, and ornament as these parts appear before the skeleton-frame with its ornament has been removed from the mold. Figs. 4 and 5 are illustrations of another mode of employing my invention; and Figs. 6, 7, 8, 9, and 10 are sections, showing different formations of the holding surfaces about the passages into which the composition is pressed.

A in the drawings represents a mold for giving the desired carved appearance to the composition ornaments; B, a skeleton wood frame into which the composition ornaments C, representing carving, are molded, and by which they are sustained and held in place.

In carrying out my invention I first make a design for the carving which is to be represented by the composition ornaments C. Next I make a pattern in accordance with the design, and from the pattern I take an impression to serve as a mold. The mold may be a cast of plaster or other material, or it may be cut in wood. In accordance with the outline of the design I make a skeleton-frame, B, and in this frame I cut or otherwise make through passages *b*, corresponding with the outline of the respective composition ornaments which are to be molded or otherwise shaped, as circumstances may require. These passages may be of tapering or dovetail form in order to retain the molded composition ornaments in position when the operation of molding is completed. Any style of holding device about the passages may be adopted without departing from my invention. The skeleton-frame I lay in the mold, and then fill or press into the open passages the composition substance of which the ornaments C are to be formed. This operation gives the carved impression formed on the mold to the composition material, and also unites the skeleton-frame and the said material firmly together, making the two almost the same as one solid piece of wood.

In order to avoid sticking to the mold of the plastic composition of which the ornamental parts are formed, tin-foil may be laid on the plaster mold, and by this means the operation will be facilitated, as the tin-foil will leave the mold with the finished article, and can be pealed off readily when the composition becomes set and dry.

In some instances the ornaments may consist of more than a single device, as in Fig. 5, and in some instances part of the mold may be left without ornament—that is, level with the surface of the skeleton-frame—and by this means some parts of the ornament will show bas-relief or high-relief, and other parts, accordingly as the mold is constructed, may appear as inlaid-work. I use the term "high-relief" because the ornament may be either sunk below the level of the surface, or be just level with the surface, or appear raised above the surface.

My invention enables me to obtain an ornament rich in character of design, and in every way substantial, and which will cost but a mere trifle as compared with wood-carving.

My mode of producing composition ornaments directly upon the wood has not the faults which are found in those modes which require that such ornaments shall be applied to the surface of the wood, such mode being insecure and rendering the ornaments liable to shrink during the process of preparation. Delicate ornaments of this kind are not easily fastened in position, and they are not easily handled without danger of breakage.

It will be seen that from my mode of producing ornamented wood great advantage will be obtained in every way, viz., easiness of production, perfect combining of the wood proper and the composition ornaments, and subsequent durability, as it will be almost impossible to separate the ornaments from their skeleton-frame unless the frame is broken into pieces; especially is this the case when the molded material is forced through passages $b$, which are formed with tapering, dovetailed, notched, fluted, or spiral surfaces about the passages, and into which the said material may be forced so as to be secure.

What I claim as my invention, and desire to secure by Letters Patent, is—

1. Wood for furniture or other purpose having composition ornaments representing carving or other designs united to it in the operation of producing the ornaments upon the wood or material which is used, such ornaments serving as a substitute for carving or other analogous work upon wood, substantially as and for the purpose described.

2. The process of producing the compound furniture and other wood herein described, said process consisting in pressing the composition into a mold and into recesses or through passages in a skeleton-frame, substantially as and for the purposes set forth.

FREDERICK KOSKUL.

Witnesses:
CHARLES G. GODFROY,
LINCOLN BOWEN.